United States Patent
Ajello

(10) Patent No.: US 9,500,315 B2
(45) Date of Patent: Nov. 22, 2016

(54) OVER-THE-DOOR KNOB HOLDER HOOK

(71) Applicant: Michael S. Ajello, Santa Ana, CA (US)

(72) Inventor: Michael S. Ajello, Santa Ana, CA (US)

(*) Notice: Subject to any disclaimer, the term of this patent is extended or adjusted under 35 U.S.C. 154(b) by 0 days.

(21) Appl. No.: 15/073,195

(22) Filed: Mar. 17, 2016

(65) Prior Publication Data

US 2016/0273705 A1 Sep. 22, 2016

Related U.S. Application Data

(60) Provisional application No. 62/135,036, filed on Mar. 18, 2015.

(51) Int. Cl.

| | | |
|---|---|---|
| A47C 25/00 | (2006.01) |
| E05C 19/00 | (2006.01) |
| F16M 13/02 | (2006.01) |
| E05B 1/00 | (2006.01) |
| E05C 3/04 | (2006.01) |
| A47G 25/32 | (2006.01) |
| E05C 3/30 | (2006.01) |
| E05C 17/50 | (2006.01) |
| E05C 19/02 | (2006.01) |
| A47G 29/00 | (2006.01) |
| A47G 25/18 | (2006.01) |
| A47G 25/06 | (2006.01) |

(52) U.S. Cl.
CPC ............ *F16M 13/022* (2013.01); *A47G 25/32* (2013.01); *E05B 1/0015* (2013.01); *E05C 3/045* (2013.01); *E05C 3/30* (2013.01); *E05C 17/50* (2013.01); *E05C 19/02* (2013.01); *A47G 25/0614* (2013.01); *A47G 25/18* (2013.01); *A47G 29/00* (2013.01)

(58) Field of Classification Search
CPC .... A47G 25/0614; A47G 9/00; A47G 25/32; E05C 19/02; E05C 19/026; E05C 19/10; E05C 517/50; E05C 3/045; E05C 3/30

USPC ............ 248/214, 215, 301, 303, 304, 690; 211/87.01, 104, 113, 118, 119; D8/367, 372

See application file for complete search history.

(56) References Cited

U.S. PATENT DOCUMENTS

| | | | |
|---|---|---|---|
| 3,322,182 A * | 5/1967 | Palella .................. | A47H 13/01 D8/380 |
| D273,272 S * | 4/1984 | Roeser ........................ | D8/367 |
| D295,607 S * | 5/1988 | Rademacher ................. | D8/367 |
| 5,014,948 A * | 5/1991 | Asaro ..................... | A47B 96/16 211/104 |
| D319,002 S * | 8/1991 | Mirza ........................... | D8/372 |
| D343,112 S * | 1/1994 | Corbin ......................... | D8/367 |
| 6,302,365 B1 * | 10/2001 | Catanzarite ........ | A47G 25/0614 248/215 |
| D755,613 S * | 5/2016 | Ajello ........................... | D8/372 |
| 2008/0116339 A1 * | 5/2008 | Simonsen .............. | A47K 10/12 248/214 |
| 2014/0332619 A1 * | 11/2014 | Yang .................. | A47G 25/0614 248/301 |

* cited by examiner

*Primary Examiner* — Tan Le

(57) ABSTRACT

An over-the-door knob holder hook provides a user with a multitude of hooks which includes interchangeable knobs. The apparatus includes a bracing bridge, a first hook assembly, and a second hook assembly. The bracing bridge attaches the first hook assembly and the second hook assembly to a door. The first hook assembly and the second hook assembly each include an elongated leg portion, an interchangeable accessory knob, a lateral portion, and a lip portion. The interchangeable accessory knob is removably mounted to a front surface of the elongated leg portion. The lateral portion is adjacently and perpendicularly connected to the front surface. The lip portion is adjacently and perpendicularly connected to the lateral portion, opposite the elongated leg portion. The elongated leg portion is adjacently and perpendicularly connected to the bracing bridge to position the first and second hook assemblies on opposite sides of the bracing bridge.

13 Claims, 4 Drawing Sheets

OVER-THE-DOOR KNOB HOLDER HOOK

The current application claims a priority to the U.S. Provisional Patent application Ser. No. 62/135,036 filed on Mar. 18, 2015.

FIELD OF THE INVENTION

The present invention relates generally to door and frame accessories. More specifically, the present invention is a double-sided door hook which fits over the top of a door in order to provide a user with a hanging anchor. The hanging anchor provides the user with a means for storing/hanging items such as towels and robes while also being decorative.

BACKGROUND OF THE INVENTION

A variety of door hooks exist today. Door hooks that hang over the door are some of the most popular due to the convenience of not having to drill into the door. Hooks such as these range from simple one sided J-configuration hooks to hooks with multiple compartments and attachment hooks. Although a variety of different types of hooks exist, not many are very appealing to the eye and lack the ability to be customized to an individual's décor. Some door hooks certainly have been made with decorative purposes in mind, but none of them have the ability to interchange the decoration components. The custom designs are simply embedded into the hook or are permanently attached into the hook. This limits the user's ability to customize the existing door hooks.

The present invention solves the aforementioned problems. The present invention is a double sided over-the-door hook that has the ability to be customized. With the present invention, the user is able to attach custom knobs and the like to personalize the door hooks. For example, individuals with polished wood furniture will be able to utilize knobs of similar quality and color to match the décor of their houses. The knobs are also used as additional hooks. In other words, the knobs will function as secondary hooks for holding up accessories, such as bath robes and towels, when the primary hooks are being used.

DETAIL DESCRIPTIONS OF THE INVENTION

All illustrations of the drawings are for the purpose of describing selected versions of the present invention and are not intended to limit the scope of the present invention.

Figure 1:
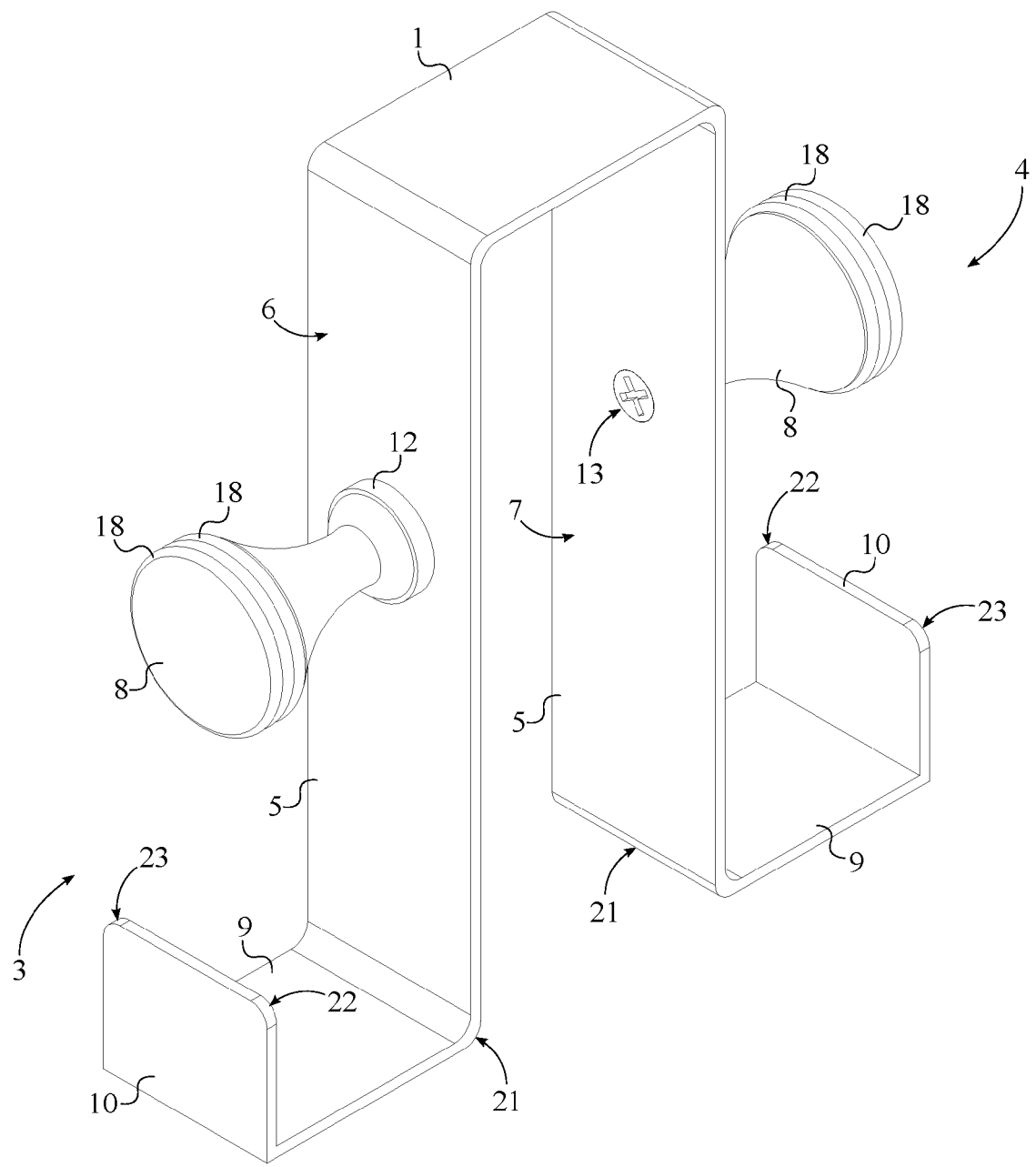
FIG. 1 is a perspective view of the present invention.

The present invention generally relates to door accessories. More specifically, the present invention is an over-the-door hook assembly which includes a pair of knobs that may be customized based on personal preference. Referring to FIG. 1, the present invention comprises a first hook assembly 3, a second hook assembly 4, and a bracing bridge 1. The first hook assembly 3 and the second hook assembly 4 provide the user with multiple tools, i.e. hooks, for holding and retaining items. More specifically, the first hook assembly 3 and the second hook assembly 4 each comprise an interchangeable accessory knob 8, a lateral portion 9, a lip portion 10, and an elongated leg portion 5. The bracing bridge 1 engages the top portion of a door in a flush manner and vertically supports the constituents of the present invention.

Figure 2:
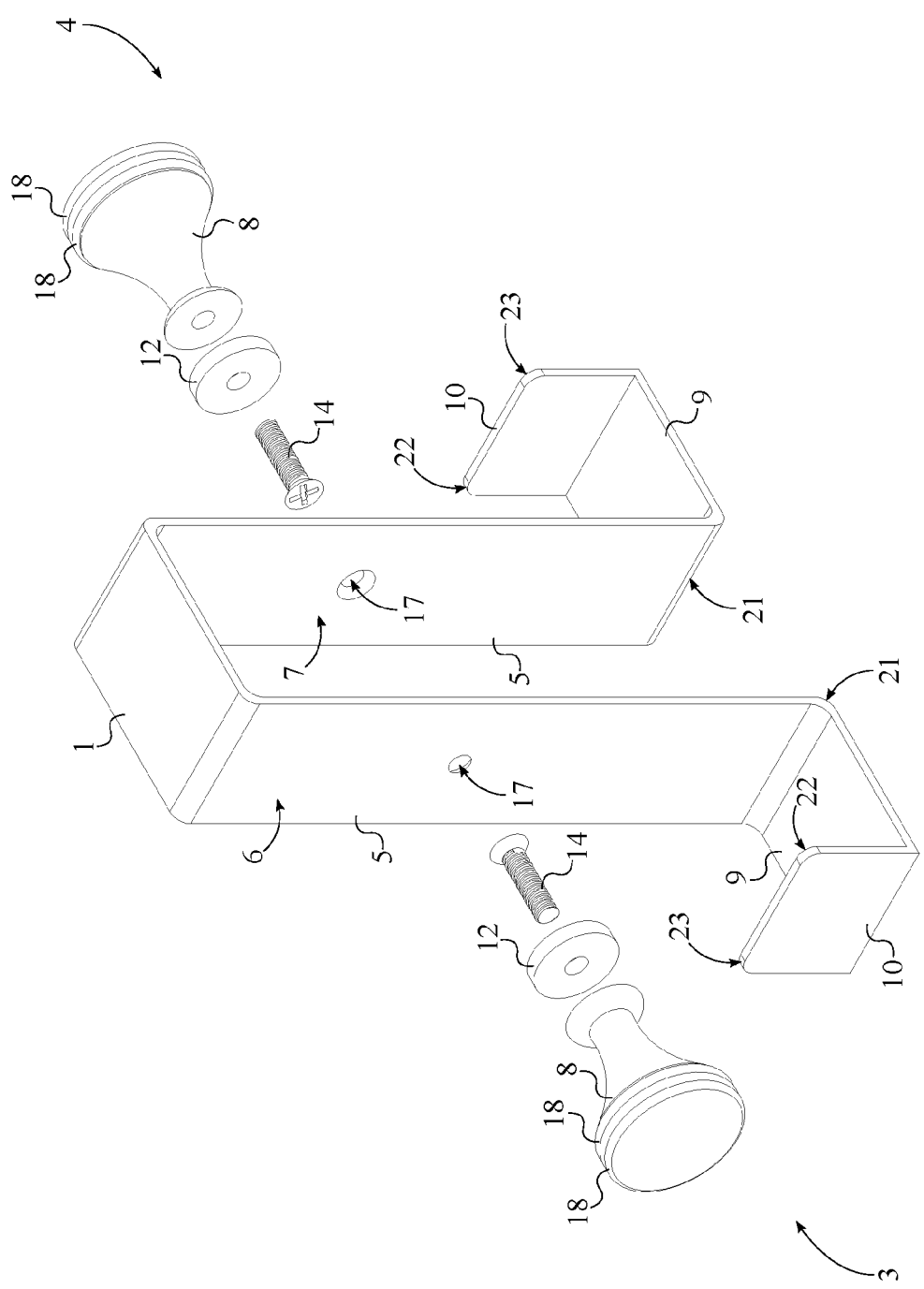
FIG. 2 is an exploded perspective view of the present invention.
Figure 4:
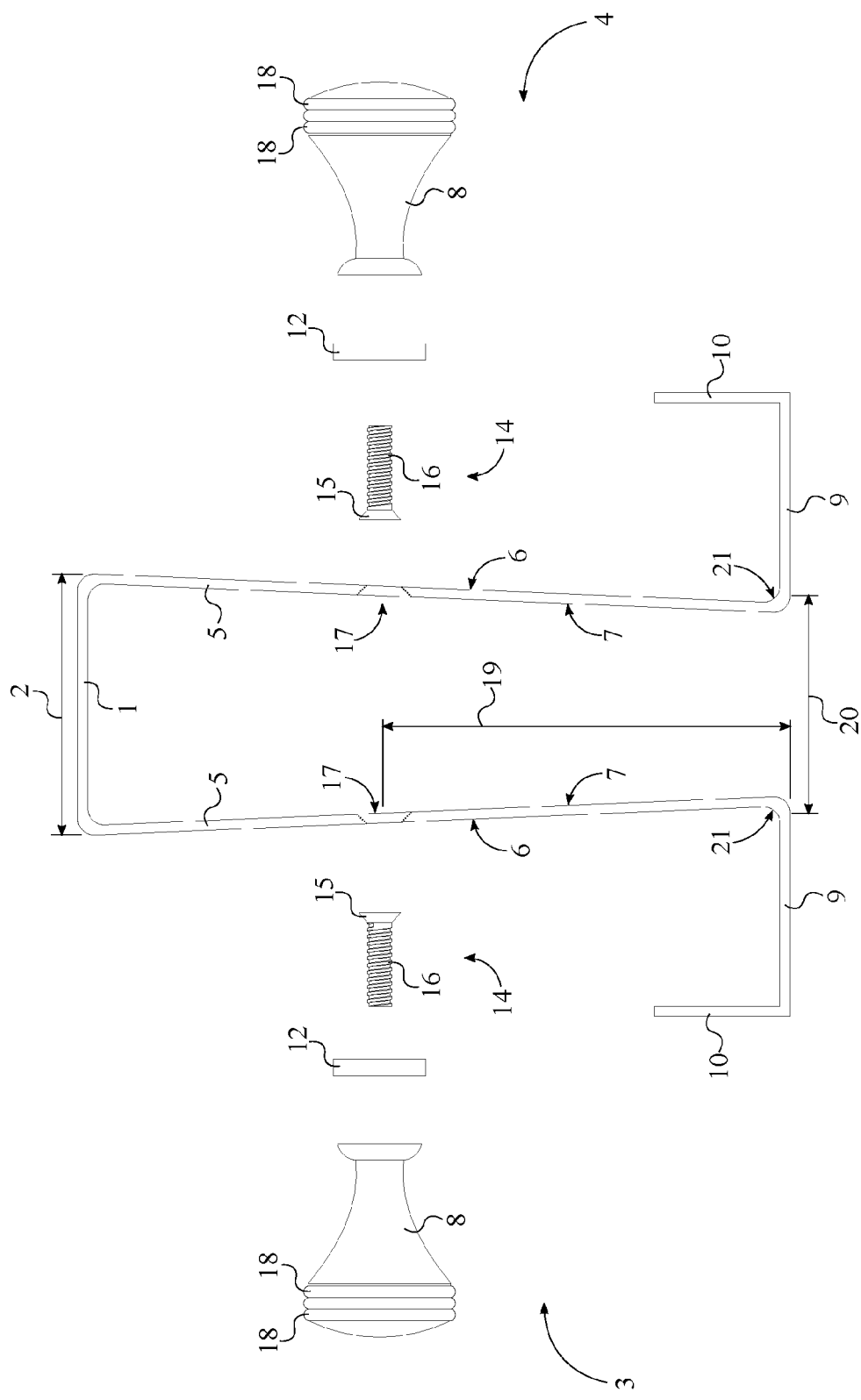
FIG. 4 is an exploded side-view of the present invention.

The interchangeable accessory knob 8 forms one of the hooks of the present invention and also acts as a decorative element that may be easily changed and/or replaced by the user. Thus, the interchangeable accessory knob 8 is adjacently and removably mounted to a front surface 6 of the elongated leg portion 5 as seen in FIG. 1 and FIG. 2. The user is able to attach various types of interchangeable accessory knobs 8 or decorative ornaments to the elongated leg portion 5, wherein interchangeable accessory knobs 8 provides a customizability that is not seen on the market today. An additional hook of the present invention is formed by the lateral portion 9 and the lip portion 10. The lateral portion 9 makes up the horizontal portion of the hook and provides vertical support for the item being held by the hook. The lateral portion 9 is adjacently and perpendicularly connected to the front surface 6 of the elongated leg portion 5, preferably below the interchangeable accessory knob 8. The lip portion 10 makes up the vertical portion of the hook and prevents the item being held by the hook from sliding off and disengaging the lateral portion 9. The lip portion 10 is adjacently and perpendicularly connected to the lateral portion 9, opposite the elongated leg portion 5. The lip portion 10 is oriented parallel to the elongated leg portion 5. Additionally, the lip portion 10 is adjacently and perpendicularly connected to the lateral portion 9, opposite the elongated leg portion 5, in order to create an item-receiving pocket. It is preferred that the lateral portion 9 and the lip portion 10 contain the same cross-section for increased usability. The lip portion 10, the lateral portion 9, and the elongated leg portion 5 create a J-shaped configuration when viewed from the side as seen in FIG. 4.

The elongated leg portion 5 is adjacently and perpendicularly connected to the bracing bridge 1 in order to vertically position the interchangeable accessory knob 8, the lateral portion 9, and the lip portion 10. This lowers the interchangeable accessory knob 8, the lateral portion 9, and the lip portion 10 to an easily accessible height for the user. In alternative embodiments of the present invention, the length of the elongated leg portion 5 may be varied in order to accommodate different door heights as well as taller or shorter users. Referring to FIG. 4, the elongated leg portion 5 of the first hook assembly 3 and the elongated leg portion 5 of the second hook assembly 4 are positioned opposite to each other across the bracing bridge 1 in order to delineate a door-receiving slot. The door-receiving slot allows the present invention to snuggly fit over the top of a door even when the door is closed. Additionally, the first hook assembly 3 and the second hook assembly 4 are oriented away from each other. This positions the first hook assembly 3 on a first side of the door and the second hook assembly 4 on a second side of the door, thus providing the user with two hook-type elements on either side of the door.

In the preferred embodiment of the present invention, the first hook assembly 3 and the second hook assembly 4 each further comprise an escutcheon 12 and a fastening mechanism 13. The escutcheon 12 covers the junction in between the interchangeable accessory knob 8 and the elongated leg portion 5. Referring to FIG. 1 and FIG. 2, the escutcheon 12 is oriented parallel to the elongated leg portion 5 and is concentrically positioned in between the interchangeable accessory knob 8 and the elongated leg portion 5. The interchangeable accessory knob 8 and escutcheon 12 are attached to the elongated leg portion 5 by the fastening mechanism 13. A variety of fasteners may be used for the fastening mechanism 13 including, but not limited to, bolts, glue, welding, and screws.

The preferred fastening mechanism 13 comprises a fastening screw 14 and a countersunk hole 17 as the countersunk hole 17 ensures a flush fitting of the fastening screw 14. The countersunk hole 17 traverses through the elongated leg portion 5 from a rear surface 7 of the elongated leg portion 5 to the front surface 6 of the elongated leg portion 5. The countersunk hole 17 is positioned offset from the lateral portion 9 by a first height 19, wherein the first height 19 is about half of the total length of the elongated leg portion 5. This configuration ensures that the interchangeable accessory knob 8 does not hit the frame around the door when the door is closed. Additionally, the countersunk hole 17 is sized to receive the fastening screw 14. The escutcheon 12 and the interchangeable accessory knob 8 are concentrically positioned with the countersunk hole 17. The fastening screw 14 is then used to secure the aforementioned components to the elongated leg portion 5. More specifically, a head 15 of the fastening screw 14 is concentrically positioned flush within the countersunk hole 17 such that the head 15 of the fastening screw 14 is flush with the rear surface 7 of the elongated leg portion 5. In the case that the thickness of the elongated leg portion 5 is too small for the countersunk hole 17 to fully receive the head 15 of the fastening screw 14, the front surface 6 of the elongated leg portion 5 may contain a raised dimple to promote a flush configuration in between the fastening screw 14 and the rear surface 7 of the elongated leg portion 5. A threaded shank 16 of the fastening screw 14 traverses through the escutcheon 12 and into the interchangeable accessory knob 8 in order to secure the escutcheon 12 and the interchangeable accessory knob 8 to the elongated leg portion 5.

In alternative embodiments of the present invention, referring to FIG. 2, the present invention also utilizes a variety of features which create a more ergonomic device. One of the features includes a clamping action. In order to secure the present invention to the door, the elongated leg portion 5 of the first hook assembly 3 and the elongated leg portion 5 of the second hook assembly 4 are designed to press towards each other as seen in FIG. 4. This is achieved by setting a width 2 of the bracing bridge 1 to be greater than a lateral distance 20 between the lateral portion 9 of the first hook assembly 3 and the lateral portion 9 of the second hook assembly 4. The difference between the width 2 and the lateral distance 20 creates a clamping force when the present invention is mounted onto the door. Another feature is rounded edges and junctions. More specifically, an upper-right corner 22 and an upper-left corner 23 of the lip portion 10 are rounded to ensure that items being hung on the present invention are not snagged or damaged by sharp edges. The elongated leg portion 5 is connected to the lateral portion 9 by a first junction 21. The first junction 21 is rounded to a certain degree in order to prevent the present invention from damaging the outer surface of the door as the first junction 21 presses against the door. Additionally, in one embodiment of the present invention, the first hook assembly 3 and the second hook assembly 4 each further comprise a plurality of ridges 18. The plurality of ridges 18 provide a means for grabbing the interchangeable accessory knob 8 and as traction elements for items being held on the interchangeable accessory knob 8. The plurality of ridges 8 is distributed along the interchangeable accessory knob 8 with each of the plurality of ridges 18 being externally connected to the interchangeable accessory knob 8.

Figure 3:
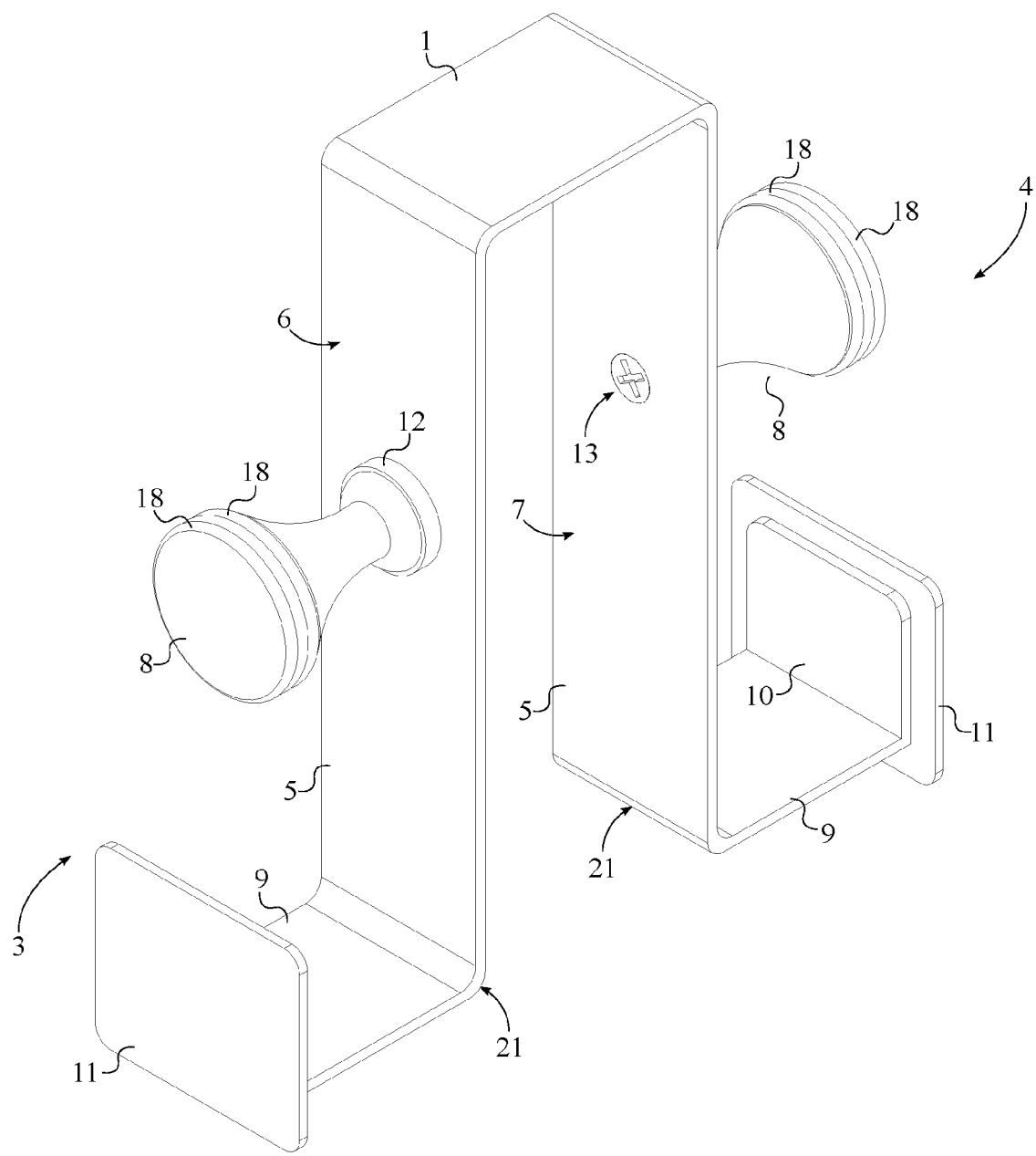
FIG. 3 is a perspective view of an alternative embodiment of the present invention.

Referring to FIG. 3, in one embodiment of the present invention, the first hook assembly 3 and the second hook assembly 4 each further comprise a plate tab 11. The plate tab 11 extends the lip portion 10 and acts as a decorative element which may be matched with the interchangeable accessory knob 8 and the user's décor. The plate tab 11 is oriented parallel to the lip portion 10 and is preferably is shaped similar to the lip portion 10 with larger dimensions. The plate tab 11 is adjacently connected to the lip portion 10, opposite the lateral portion 9. The plate tab 11 may be composed of a variety of different materials as well as have a variety of surface finishes. Furthermore, the plate tab 11 may be attached/connected to the lip portion 10 prior to manufacturing or as an aftermarket component.

The bracing bridge 1 is preferably a thin and a rectangular piece of structural material, that is designed to fit over the standard door. It is necessary for the bracing bridge 1 to be thin so that the bracing bridge 1 does not to interfere with the door frame when the door is closed within the door frame. The preferred material is 16 gauge 304 stainless steel, although alternative materials and sizes may also be utilized. For example, if the clearance between the door and the door frame is much smaller than expected, the bracing bridge 1 can be made from a thinner material such as 18 gauge 304 stainless steel.

In the preferred embodiment of the present invention, the bracing bridge 1, the elongated leg portion 5 of the first hook assembly 3, the lateral portion 9 of the first hook assembly 3, the lip portion 10 of the first hook assembly 3, the elongated leg portion 5 of the second hook assembly 4, the lateral portion 9 of the second hook assembly 4, and the lip portion 10 of the second hook assembly 4 are all preferably formed from a single strap of stainless steel that is one inch wide. A total of six folds on the steel strap create the aforementioned components. Each of the folds is preferably 90 degrees.

Although the invention has been explained in relation to its preferred embodiment, it is to be understood that many other possible modifications and variations can be made without departing from the spirit and scope of the invention as hereinafter claimed.

What is claimed is:

1. An over-the-door knob holder hook comprises:
a first hook assembly;
a second hook assembly;
a bracing bridge;
the first hook assembly and the second hook assembly each comprise an elongated leg portion, an interchangeable accessory knob, a lateral portion, and a lip portion;
the interchangeable accessory knob being adjacently and removably mounted to a front surface of the elongated leg portion;
the lateral portion being adjacently and perpendicularly connected to the front surface of the elongated leg portion;
the lip portion being oriented parallel to the elongated leg portion;
the lip portion being adjacently and perpendicularly connected to the lateral portion, opposite the elongated leg portion;
the elongated leg portion being adjacently and perpendicularly connected to the bracing bridge;
the elongated leg portion of the first hook assembly and the elongated leg portion of the second hook assembly being positioned opposite to each other across the bracing bridge; and the first hook assembly and the second hook assembly being oriented away from each other;

the first hook assembly and the second hook assembly each further comprise a plate tab;

the plate tab being oriented parallel to the lip portion; and the plate tab being adjacently connected to the lip portion, opposite the lateral portion.

2. The over-the-door knob holder hook as claimed in claim 1 comprises:

the first hook assembly and the second hook assembly each further comprise an escutcheon and a fastening mechanism;

the escutcheon being oriented parallel to the elongated leg portion;

the escutcheon being concentrically positioned in between the interchangeable accessory knob and the elongated leg portion; and the interchangeable accessory knob and the escutcheon being attached to the elongated leg portion by the fastening mechanism.

3. The over-the-door knob holder hook as claimed in claim 2 comprises:

the fastening mechanism comprises a fastening screw and a countersunk hole;

the countersunk hole traversing through the elongated leg portion from a rear surface of the elongated leg portion to the front surface of the elongated leg portion;

the countersunk hole being positioned offset from the lateral portion by a first height;

the interchangeable accessory knob and the escutcheon being concentrically positioned with the countersunk hole;

a head of the fastening screw being concentrically positioned flush within the countersunk hole; and a threaded shank of the fastening screw traversing through the escutcheon and into the interchangeable accessory knob.

4. The over-the-door knob holder hook as claimed in claim 1 comprises:

a width of the bracing bridge being greater than a lateral distance between lateral portion of the first hook assembly and the lateral portion of the second hook assembly.

5. The over-the-door knob holder hook as claimed in claim 1 comprises:

the elongated leg portion being connected to the lateral portion by a first junction; and the first junction being rounded.

6. The over-the-door knob holder hook as claimed in claim 1, wherein an upper-right corner and an upper-left corner of the lip portion are rounded.

7. The over-the-door knob holder hook as claimed in claim 1 comprises:

the first hook assembly and the second hook assembly each further comprise a plurality of ridges;

the plurality of ridges being distributed along the interchangeable accessory knob; and each of the plurality of ridges being externally connected to the interchangeable accessory knob.

8. An over-the-door knob holder hook comprises:

a first hook assembly;

a second hook assembly;

a bracing bridge;

the first hook assembly and the second hook assembly each comprise an elongated leg portion, an interchangeable accessory knob, a lateral portion, a lip portion, an escutcheon and a fastening mechanism;

the interchangeable accessory knob being adjacently and removably mounted to a front surface of the elongated leg portion;

the lateral portion being adjacently and perpendicularly connected to the front surface of the elongated leg portion;

the lip portion being oriented parallel to the elongated leg portion;

the lip portion being adjacently and perpendicularly connected to the lateral portion, opposite the elongated leg portion;

the elongated leg portion being adjacently and perpendicularly connected to the bracing bridge;

the elongated leg portion of the first hook assembly and the elongated leg portion of the second hook assembly being positioned opposite to each other across the bracing bridge;

the first hook assembly and the second hook assembly being oriented away from each other;

the escutcheon being oriented parallel to the elongated leg portion;

the escutcheon being concentrically positioned in between the interchangeable accessory knob and the elongated leg portion; and the interchangeable accessory knob and the escutcheon being attached to the elongated leg portion by the fastening mechanism;

the first hook assembly and the second hook assembly each further comprise a plate tab;

the plate tab being oriented parallel to the lip portion; and the plate tab being adjacently connected to the lip portion, opposite the lateral portion.

9. The over-the-door knob holder hook as claimed in claim 8 comprises:

the fastening mechanism comprises a fastening screw and a countersunk hole;

the countersunk hole traversing through the elongated leg portion from a rear surface of the elongated leg portion to the front surface of the elongated leg portion;

the countersunk hole being positioned offset from the lateral portion by a first height;

the interchangeable accessory knob and the escutcheon being concentrically positioned with the countersunk hole;

a head of the fastening screw being concentrically positioned flush within the countersunk hole; and a threaded shank of the fastening screw traversing through the escutcheon and into the interchangeable accessory knob.

10. The over-the-door knob holder hook as claimed in claim 8 comprises:

a width of the bracing bridge being greater than a lateral distance between lateral portion of the first hook assembly and the lateral portion of the second hook assembly.

11. The over-the-door knob holder hook as claimed in claim 8 comprises:

the elongated leg portion being connected to the lateral portion by a first junction; and the first junction being rounded.

12. The over-the-door knob holder hook as claimed in claim 8, wherein an upper-right corner and an upper-left corner of the lip portion are rounded.

13. The over-the-door knob holder hook as claimed in claim 8 comprises:

the first hook assembly and the second hook assembly each further comprise a plurality of ridges;

the plurality of ridges being distributed along the interchangeable accessory knob; and each of the plurality of ridges being externally connected to the interchangeable accessory knob.

* * * * *